Aug. 9, 1960 M. W. KENNEY 2,948,539

TURNTABLE

Filed Aug. 3, 1951

Inventor
Mahlon W. Kenney
By John F. Eakins
Attorney 2,948,539

TURNTABLE

Mahlon W. Kenney, Oak Park, Ill., assignor, by mesne assignments, to The Seeburg Corporation, a corporation of Pennsylvania Filed Aug. 3, 1951, Ser. No. 240,198

4 Claims. (Cl. 274—39)

This invention relates to turntables for phonographs and particularly to such turntables driven through gearing which tends to introduce "flutter" into the audible reproduction.

The principal object of the invention is to provide an improved mounting for a turntable on its shaft which will be simple and practical and which reduces "flutter" to negligible extent.

According to the present invention I mount the turntable on the shaft with a bearing which maintains accurate coaxial relation between them. I provide a connection including resilient material such as rubber between the turntable and the shaft. For good reproduction, the bearing between the shaft and the turntable should be accurate to preserve concentricity of the turntable. I have found that for effective suppression of "flutter" the bearing between the shaft and turntable must have extremely low static friction such as is provided by roller-type bearings including ball bearings which I prefer to employ.

The invention will readily be understood from the following description of a preferred embodiment thereof taken in conjunction with the accompanying drawings. It is to be noted that this embodiment is applicable to the type of phonograph described and claimed in Reissue Patent No. 22,551 and Patents Nos. 2,281,548, 2,323,365 and 2,458,496, in which the record is played in vertical position and is clamped to the turntable, but it will readily be understood that it is equally applicable to all phonograph turntables. In the drawings, Figure 1 is a sectional elevational view of a turntable embodying my invention;

Figures 1, 2, 3, 4, 5:
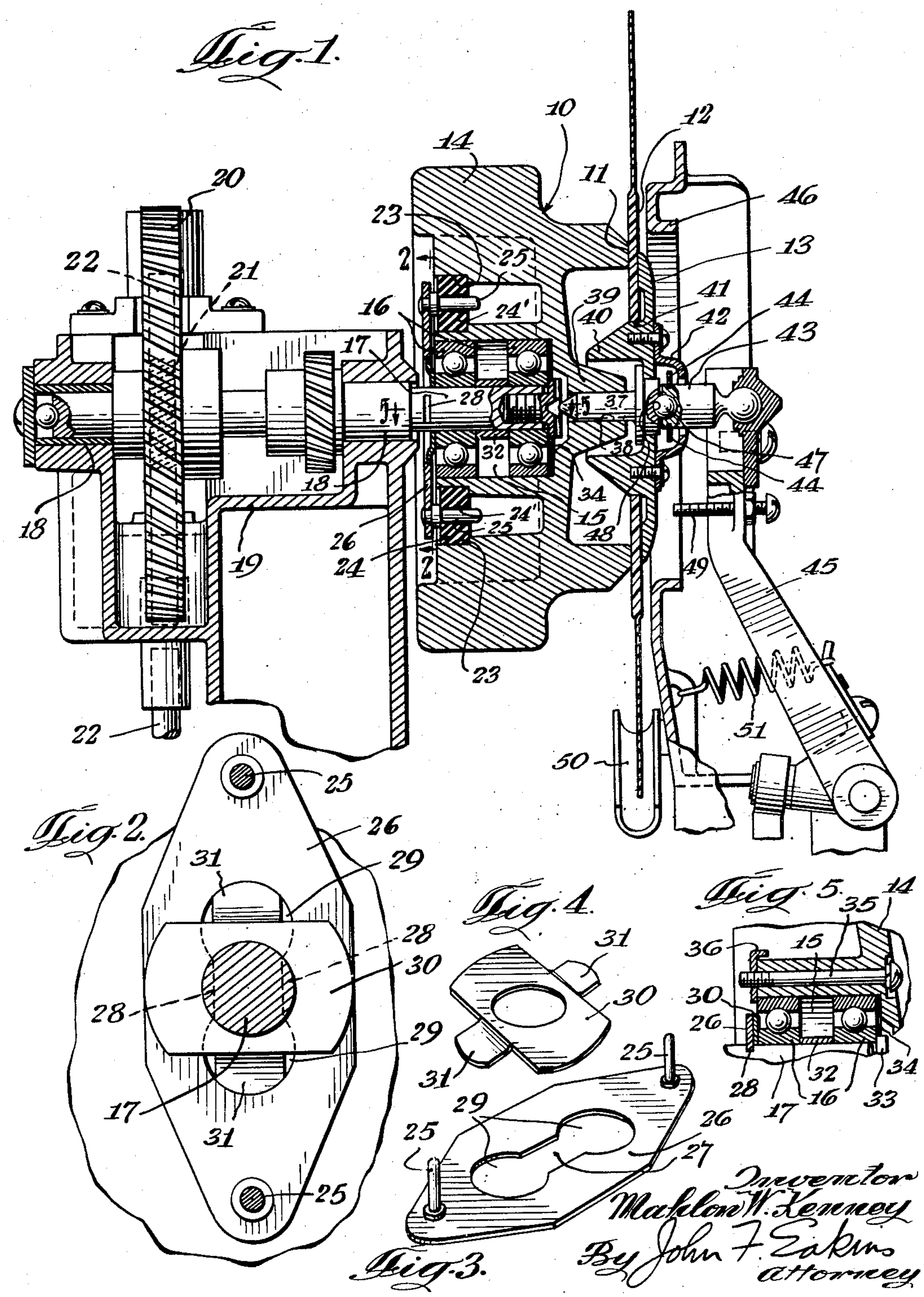
Fig. 2 is a sectional detail, the section being taken at the line 2—2 of Fig. 1.
Fig. 3 is a perspective view of the double arm member.
Fig. 4 is a perspective view of a washer employed in the assembly.
Fig. 5 is a fragmentary sectional detail taken on the line 5—5 of Fig. 1 showing the manner in which the turntable is secured to the assembly.

Referring to the drawings, the turntable 10 comprises an annular surface 11 against which the record 12 is clamped by a clamping member 13. The turntable 10 also includes a heavy portion 14 located to serve as an effective fly-wheel.

The fly-wheel has an axial recess 15 which frictionally receives the ball-bearings 16, the inner races of which are frictionally mounted on the shaft 17. The shaft 17 is mounted by bearings 18 on a frame 19 and carries a worm gear 20 which is driven by a worm 21 on a shaft 22 extending upwardly from a motor (not shown).

The turntable 10 is provided with two diametrically recesses 23 which receive plugs 24 of live rubber or other similar resilient material. These plugs are provided with inwardly flaring openings 24' for the reception of pins 25 carried by a double arm member 26. The member 26 is provided with a central slot 27 the edges of which are normally located in opposite similar slots 28 in the shaft 17, thus rigidly securing the member 26 to the shaft 17. The slot 27 gives into large terminal openings 29 which permit application of the member 26 to the shaft.

A washer 30 is located between the turntable and the member 26. This washer has a central opening which fits the shaft 17 and two lugs 31 which are displaced out of the plane of the washer 30 and into the plane of the adjacent member 26. The lugs 31 fit into the openings 29 in the member 26 thus maintaining the member 26 in centered position on the shaft.

In assembling the turntable, the member 26 is applied to the shaft 17 by one of the openings 29 and brought into centered position with the edges of the slot 27 seated in the opposed slots 28 in the shaft 17. The washer 30 is then applied to the shaft and its lugs 31 are located in the openings 29 of the member 26 to maintain its centered position. A ball bearing 16, a spacing sleeve 32 and the second ball bearing 16 are applied to the shaft 17 and a shouldered screw 33 is screwed into the tapped end of the shaft 17 thus rigidly securing the inner races of the ball bearings, the spaces 32, washer 30 and member 26 to the shaft 17. The rubber plugs 24 are inserted in their recesses 23 with the smaller ends of their openings 24' at their outer sides, a light corrugated annular spring 34 is seated on the inner end of the recess 15 of the turntable and the recess 15 is then forced over the ball bearings 16 to bring the turntable into its position in Fig. 1 with the pins 25 inserted in the openings 24'. The turntable 10 is finally secured in this position by means of two diametrically opposed long screws 35 which are screwed into nuts 36 which abut against the outer race of the first applied ball bearing 16 and an adjacent part of the turntable 10 as shown in Fig. 5.

The clamping member 13 is provided with a pointed central pin 37 which is arranged to enter a bore 38 in a boss 39 at the center of the turntable. The clamping member 13 is provided with a circular formation 40 which is arranged to surround the boss 39. The formation 40 tapers towards the turntable and the tapered portion gives into a larger cylindrical portion 41 which fits into the center hole of the record 12 whne the same is clamped to the turntable as shown in Fig. 1. On its outer side the clamping member carries a housing 42 whereby it is connected to a rod 43 by means of a C-washer 44. The rod 43 has a ball socket connection with a pivoted arm 45 which carries the clamping member 13 into and out of engagement with the turntable 10 through a stripper ring 46. The rod 43 has a ball 47 peened into its end, which ball is arranged to seat on a ball seat 48 on the axis of the clamping member 13 when the record is clamped in playing position. The arm 45 carries an adjustable screw 49 against which the clamping member 13 rests when it is retracted from the turntable. This screw is adjusted so that the pin 37 enters the bore 38 when the arm 45 carries the clamping member 13 into clamping position. The record is rolled along a ramp 50 and between the turntable 10 and the stripper ring 46 by an actuating member (not shown). The pin 37 enters the bore 38 through the center hole of the record and the formation 40, also passing through the center hole, carries the record away from the ramp and actuating means, the record being finally clamped as shown in Fig. 1. It is to be noted that when the record is thus clamped the clamping member is entirely free from all its associated elements except the ball 47 which exerts the clamping pressure of the spring 51 on its axis.

Having thus described my invention, I declare that what I claim is:

1. In a phonograph mechanism, in combination, a shaft, a turntable having a recess receiving said shaft, roller-type bearing means in said recess having their inner and outer races secured to the shaft and turntable respectively mounting said turntable on said shaft in coaxial relation thereto, and a drive connection between said shaft and turntable including resilient means, said turntable being connected to said shaft only by said connection and said roller-type bearing means.

2. In a phonograph mechanism, in combination, a shaft, a turntable having a recess receiving said shaft, a pair of spaced ball bearings in said recess having their inner and outer races secured to the shaft and turntable respectively mounting said turntable on said shaft in coaxial relation thereto, and a drive connection between said shaft and turntable including resilient means, said turntable being connected to said shaft only by said connection and said ball bearings.

3. In a phonograph mechanism, in combination, a shaft, a turntable having a recess receiving said shaft, roller-type bearing means in said recess having their inner and outer races secured to the shaft and turntable respectively mounting said turntable on said shaft in coaxial relation thereto, and a drive connection between said shaft and turntable including a rigid member secured to said shaft, a pair of pins of uniform cross-section carried by said rigid member and resilient material secured to said turntable having a pair of flaring openings receiving said pins in engagement with their smaller ends, said turntable being connected to said shaft only by said roller-type bearings and said pins and resilient material.

4. In a phonograph mechanism, in combination, a shaft, a turntable having a recess receiving said shaft, a pair of spaced ball bearings in said recess having their inner and outer races secured to the shaft and turntable respectively mounting said turntable on said shaft in coaxial relation thereto, and a drive connection between said shaft and turntable including a rigid member secured to said shaft, a pair of pins of uniform cross-section carried by said rigid member and two plugs of resilient material carried in recesses in said turntable, each having an inwardly flaring opening receiving a pin in engagement with its smaller end, said turntable being connected to said shaft only by said ball bearings and said pins and plugs.

References Cited in the file of this patent

UNITED STATES PATENTS

| | | |
|---|---|---|
| 1,820,154 | Peets | Aug. 25, 1931 |
| 1,854,941 | Kiel | Apr. 19, 1932 |
| 1,946,661 | Baker | Feb. 13, 1934 |
| 2,512,735 | Beier | June 27, 1950 |
| 2,680,386 | Selsted | June 8, 1954 |
| 2,720,764 | Landrum | Oct. 18, 1955 |

FOREIGN PATENTS

| | | |
|---|---|---|
| 334,679 | Great Britain | Sept. 11, 1930 |
| 576,691 | Great Britain | Apr. 16, 1946 |
| 715,277 | France | Nov. 28, 1931 |